US010604030B2

(12) United States Patent
Hairer et al.

(10) Patent No.: US 10,604,030 B2
(45) Date of Patent: Mar. 31, 2020

(54) CONTROL ELEMENT HOUSING AND DOOR INTERIOR TRIM COMPRISING A CONTROL ELEMENT HOUSING OF THIS TYPE

(71) Applicant: Bayerische Motoren Werke Aktiengesellschaft, Munich (DE)

(72) Inventors: Gabriel Hairer, Munich (DE); Steffen Sattler, Ismaning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 252 days.

(21) Appl. No.: 15/720,347

(22) Filed: Sep. 29, 2017

(65) Prior Publication Data
US 2018/0022234 A1    Jan. 25, 2018

Related U.S. Application Data

(63) Continuation of application No. PCT/EP2016/056804, filed on Mar. 29, 2016.

(30) Foreign Application Priority Data

Mar. 31, 2015  (DE) .................. 10 2015 205 779

(51) Int. Cl.
   *B60J 5/04*       (2006.01)
   *H01H 9/02*       (2006.01)
   (Continued)

(52) U.S. Cl.
   CPC .......... *B60N 2/0228* (2013.01); *B60J 5/0413* (2013.01); *H01H 9/0271* (2013.01); *B60R 13/0243* (2013.01); *B60R 2011/0021* (2013.01)

(58) Field of Classification Search
   CPC .................. B60J 5/0413; B60J 5/0416; B60R 2011/0021; B60R 7/046; B60R 13/0243; B60R 2021/0006; H01H 9/0271
   (Continued)

(56) References Cited

U.S. PATENT DOCUMENTS 3,254,163 A    5/1966  Wanlass
5,171,058 A *  12/1992 Ishikawa ................ B60J 5/0426
                                                296/146.7
(Continued)

FOREIGN PATENT DOCUMENTS

DE    198 59 987 A1    6/2000
EP      0 977 321 A1    2/2000
(Continued)

OTHER PUBLICATIONS

International Search Report (PCT/ISA/210) issued in PCT Application No. PCT/EP2016/056804 dated Aug. 17, 2016 with English translation (seven pages).
(Continued)

*Primary Examiner* — Gregory A Blankenship
(74) *Attorney, Agent, or Firm* — Crowell & Moring LLP

(57) ABSTRACT

A control element housing has a front face that receives at least one control element, a rear face lying opposite the front face, a first side face and a second side face lying opposite the first side face, the two side faces connecting the front face to the rear face, a base which interconnects the two side faces and the rear face, and an upper face lying opposite the base, the upper face connecting the front face, the first side face, the second side face and the rear face. The base and/or the upper face has or have at least one structural weakening that allows the control element housing to be deformed under mechanical stress. Also disclosed is a door interior trim having the control element housing.

7 Claims, 5 Drawing Sheets

(51) Int. Cl.
B60R 11/00 (2006.01)
B60R 13/02 (2006.01)
B60N 2/02 (2006.01)

(58) Field of Classification Search
USPC ......... 296/187.05, 187.12, 146.7, 152, 37.13
See application file for complete search history.

(56) References Cited

U.S. PATENT DOCUMENTS

| | | | | |
|---|---|---|---|---|
| 5,531,499 | A * | 7/1996 | Vecchio | B60R 13/0206 |
| | | | | 188/377 |
| 6,036,251 | A * | 3/2000 | Yagishita | B60J 5/0451 |
| | | | | 280/751 |
| 7,677,640 | B2 * | 3/2010 | Dix | B60R 21/0428 |
| | | | | 296/146.7 |
| 7,794,009 | B2 * | 9/2010 | Pinkerton | B60N 2/4235 |
| | | | | 296/153 |
| 8,141,937 | B2 * | 3/2012 | Tsuyuzaki | B60J 5/0425 |
| | | | | 296/146.6 |
| 8,267,428 | B2 * | 9/2012 | DePue | B60R 21/02 |
| | | | | 280/751 |
| 8,511,746 | B2 * | 8/2013 | Kawamura | B62D 25/025 |
| | | | | 296/187.12 |
| 9,452,727 | B2 * | 9/2016 | Hase | B60R 21/0428 |
| 10,029,625 | B1 * | 7/2018 | Mejia Perez | B60R 13/0206 |
| 2007/0214845 | A1 | 9/2007 | Gilleo et al. | |
| 2008/0296296 | A1 | 12/2008 | Anders et al. | |
| 2009/0134660 | A1 * | 5/2009 | Pinkerton | B60N 2/4235 |
| | | | | 296/146.7 |
| 2010/0225144 | A1 * | 9/2010 | Endo | B60J 5/0451 |
| | | | | 296/187.05 |
| 2012/0012385 | A1 * | 1/2012 | Lee | B60N 2/0228 |
| | | | | 174/561 |
| 2013/0200678 | A1 | 8/2013 | Hirokawa et al. | |
| 2014/0035322 | A1 * | 2/2014 | Sakhara | B62D 25/02 |
| | | | | 296/187.12 |
| 2015/0291010 | A1 * | 10/2015 | Gillay | B60J 5/0416 |
| | | | | 296/146.7 |
| 2017/0113521 | A1 * | 4/2017 | Endo | B60R 16/0215 |
| 2018/0022234 | A1 * | 1/2018 | Hairer | H01H 9/0271 |
| | | | | 701/36 |
| 2019/0001902 | A1 * | 1/2019 | Kern | B60R 13/0243 |
| 2019/0077324 | A1 * | 3/2019 | Dunham | B60R 7/046 |

FOREIGN PATENT DOCUMENTS

| | | |
|---|---|---|
| EP | 1 439 746 A2 | 7/2004 |
| EP | 1 978 535 A2 | 10/2008 |
| FR | 2 819 933 A1 | 7/2002 |
| JP | 2002-268124 A | 9/2002 |
| WO | WO 2010/107582 A1 | 9/2010 |

OTHER PUBLICATIONS

German-language Written Opinion (PCT/ISA/237) issued in PCT Application No. PCT/EP2016/056804 dated Aug. 17, 2016 (four pages).

German Search Report issued in counterpart German Application No. 10 2015 205 779.8 dated Jul. 24, 2017 with partial English translation (13 pages).

* cited by examiner

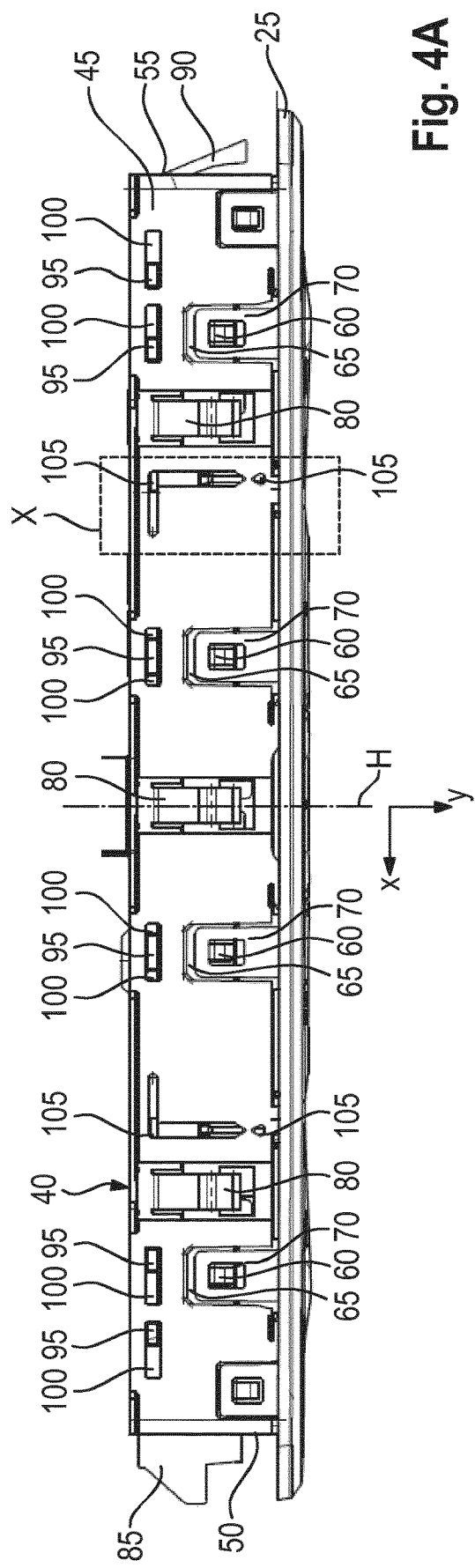
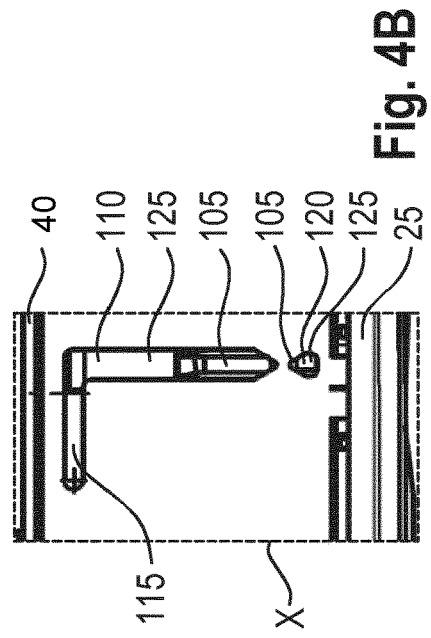

CONTROL ELEMENT HOUSING AND DOOR INTERIOR TRIM COMPRISING A CONTROL ELEMENT HOUSING OF THIS TYPE

CROSS REFERENCE TO RELATED APPLICATIONS

This application is a continuation of PCT International Application No. PCT/EP2016/056804, filed Mar. 29, 2016, which claims priority under 35 U.S.C. § 119 from German Patent Application No. 10 2015 205 779.8, filed Mar. 31, 2015, the entire disclosures of which are herein expressly incorporated by reference.

BACKGROUND AND SUMMARY OF THE INVENTION

The present invention relates to a control element housing. In addition, the present invention relates to a door interior trim equipped with this control element housing.

Known control element housings have a front face, a rear face lying opposite the front face, a first side face, and a second side face lying opposite the first side face. The two side faces connect the front face to the rear face. Also part of the known control element housings are a bottom face which connects the two side faces and the rear face together, and a top face lying opposite the bottom face and connecting the front face, the first side face, the second side face and the rear face. The control element housing also usually contains electronics which can be activated by a user via control elements arranged on at least one face, in particular the front face. Thus it is known to perform an adjustment of a vehicle seat, in particular the rake of its backrest, by means of a control element arranged on a door interior trim of a motor vehicle, or in the case of heated seats, to cause a change in temperature of the seat base. Because of the design or structure, the known control element housing is formed rigidly. This means that, in particular in the fitted state, it is only poorly or very limitedly deformable, even though a defined deformability would be desirable.

It is therefore an object of the present invention to create a control element housing which overcomes the above-mentioned disadvantages.

This object is achieved by a control element housing of the type described above, wherein the bottom face and/or the top face of the control element housing has or have at least one structural weakening which allows the control element housing to be deformed under mechanical load. By the targeted provision of predefined structural weakenings, it is advantageously possible to achieve a defined deformability of the control element housing according to the invention.

A simple solution, which is in particular preferred for technical production reasons, is achieved if the structural weakening is a recess or a material thinning on the bottom face and/or top face of the control element housing.

A particularly simple and hence preferred embodiment of the control element housing according to the invention is achieved if the structural weakening comprises an L-shape situated in the plane of the bottom face and/or the top face.

In a particularly preferred embodiment of the control element housing according to the invention, it is provided that the first leg of the L-shape is arranged substantially parallel to the first side face and/or the second side face, and the second leg of the L-shape is arranged substantially parallel to the rear face.

For further precision or further improved distribution of the force flow, allowing the deformation of the control element according to the invention, along the faces comprising the structural weakening, it may be provided that the recess and/or material thinning is formed round, in particular circular round, or triangular, in particular with rounded edges.

For the case where the structural weakening is a recess, the components, for example electronic components, in the control element housing according to the invention may advantageously be protected from moisture or dust by at least one seal sealing the recess.

In some cases, a control element may in practice be exposed to severe deformation. To avoid its partial or complete destruction in this case, according to the invention it is provided that the rear face is configured so as to be movable relative to the first side face, the second side face, the bottom face and the top face.

A particularly simple construction of the control element housing according to the invention is achieved if the rear face comprises at least one locking device which engages in recesses of the bottom face and/or the top face. In addition, such a control element housing may be produced easily since the individual elements can be pushed together.

A particularly even force flow in the control element housing according to the invention is achieved if at least two structural weakenings are provided which are arranged symmetrically to the height plane of the control element housing. This applies in particular in the case that the control element housing is subjected to a bending moment about its vertical axis.

The control element housing according to the invention may be arranged on a door interior trim particularly easily by means of locking devices arranged on the first side face and on the second side face.

The above-mentioned object is also achieved by a door interior trim which comprises a control element housing according to the invention of the type disclosed above. The advantages associated with the control element housing according to the invention apply similarly to a correspondingly equipped door interior trim. It is pointed out that the term "door interior trim" in the sense of the present disclosure means not only a door trim of a motor vehicle, but any form of side trim of a motor vehicle.

The above-mentioned features of the present invention may be combined with each other where possible, even if not explicitly described as such above.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 4A shows from above the control element housing depicted in FIG. 2.

FIG. 4B shows an enlarged extract from FIG. 4A.

DETAILED DESCRIPTION OF THE DRAWINGS

With reference to FIGS. 1 to 5, a detailed, non-prejudicial, in particular non-restrictive description is given below of exemplary embodiments of the present invention. The same elements carry identical reference signs unless specified otherwise.

Figure 1:
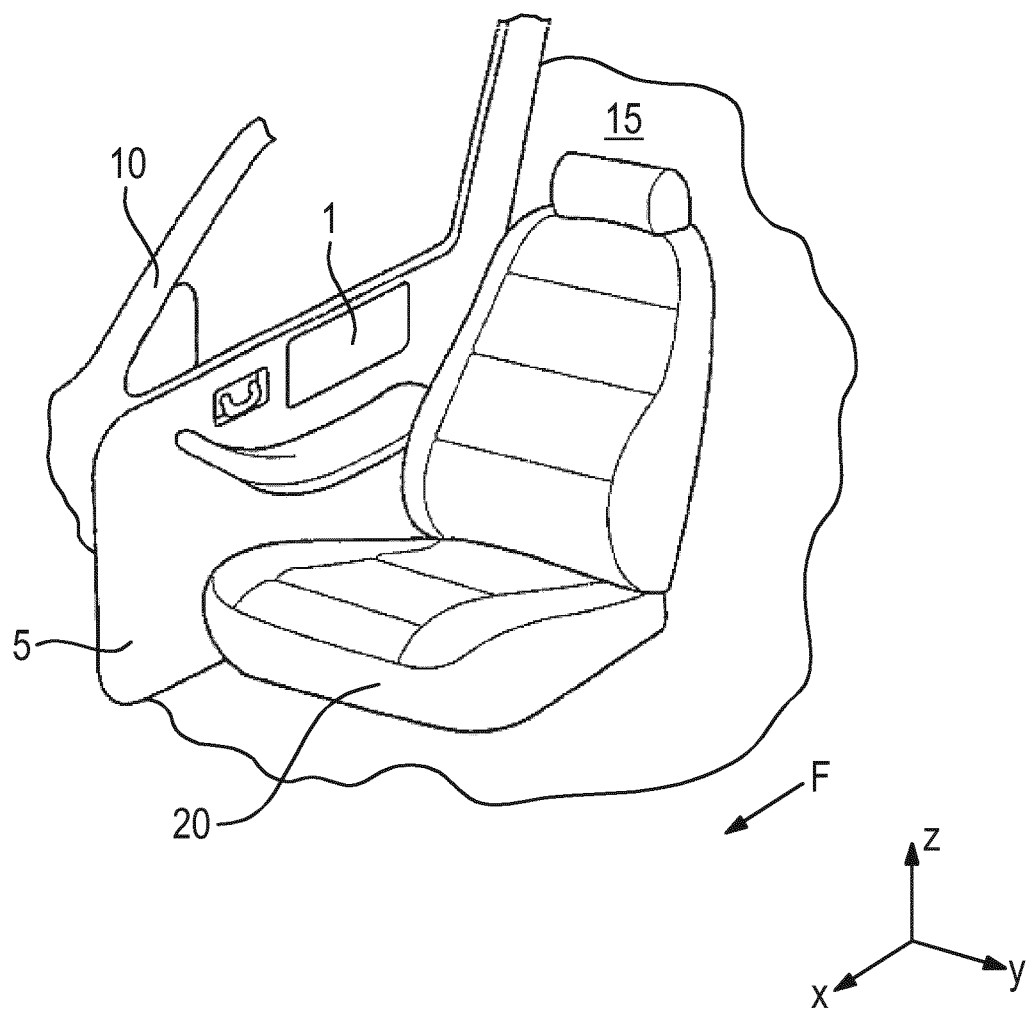
FIG. 1 is a perspective top view of a door interior trim which is provided with a control element housing according to an embodiment of the invention, depicted symbolically.

FIG. 1 shows symbolically a control element housing 1 according to an embodiment of the invention, which is mounted, for example clipped, onto the door interior trim 5 of a vehicle door 10 of a motor vehicle 15. The control element housing 1, viewed in the main direction of travel F, is situated to the right of a seat 20. It is pointed out that the control element housing 1 or the door interior trim 5 shown as examples in this figure may also be arranged at other arbitrary points of the motor vehicle 15, in particular on the driver's side (not shown) or in the back (not shown).

Figure 2:
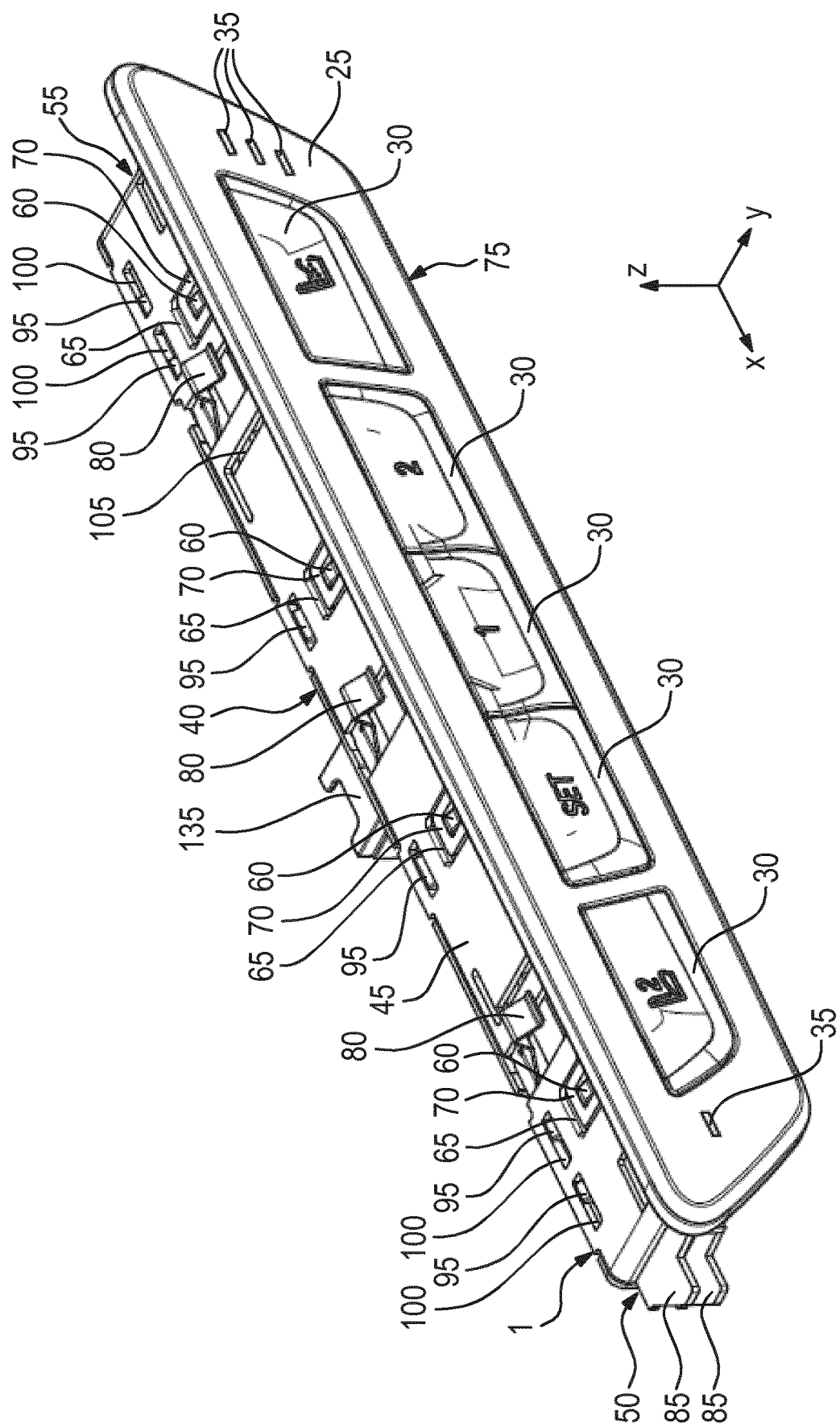
FIG. 2 is a perspective view, from obliquely above, of an unloaded control element housing according to an embodiment of the invention.

FIG. 2 shows a control element housing 1 in a perspective view from obliquely above. The control element housing 1 has a front face 25 in which, in the example shown here, a control element 30 consisting of five buttons is arranged. This control element or these buttons 30 is/are coupled to an electrical and/or electronic apparatus (not shown here) situated in the control element housing 1, and may activate widely varying functions. Thus for example it is possible, by pressing a button 30, to switch on a seat heater and/or a massage function located in a seat 20, or by means of another button make an adjustment to the seat 20 in the motor vehicle 15 and save this setting. By means of displays 35 also located on the front face 25, a status display may be given for example of the achieved temperature level of the seat heating or the adjustment position of the seat 20, as is known from the prior art. It is pointed out that the type, number and position of the buttons 30 and displays 35 shown in this figure are selected arbitrarily. In addition, the presence of buttons 30 is not essential; rather, other input means, in particular a touchpad or touchscreen, may be provided on the front face 25.

The control element housing 1 shown in FIG. 1 is configured substantially elongate and extends in the direction of an x-axis of a Cartesian vehicle-oriented coordinate system known in itself, which in the example shown here is oriented parallel to the main direction of travel F.

Opposite the front face 25, i.e. offset parallel in the y-direction using the Cartesian vehicle-oriented coordinate system, is a rear face 40 of the control element housing 1. The front face 25 and rear face 40 are connected together by a top face 45, a first side face 50 and a second side face 55. For this, four depressions 65 are arranged on the outside of the top face 45 and are provided with locking hooks 60, on which corresponding tabs 70 of the front face 25 are engaged.

A plug housing 135 is arranged on the rear face 40 so that the electrical and/or electronic components situated in the control element housing may be connected to the on-board electronics and/or power network of the motor vehicle 15 via a cable (not shown here).

Figure 3:
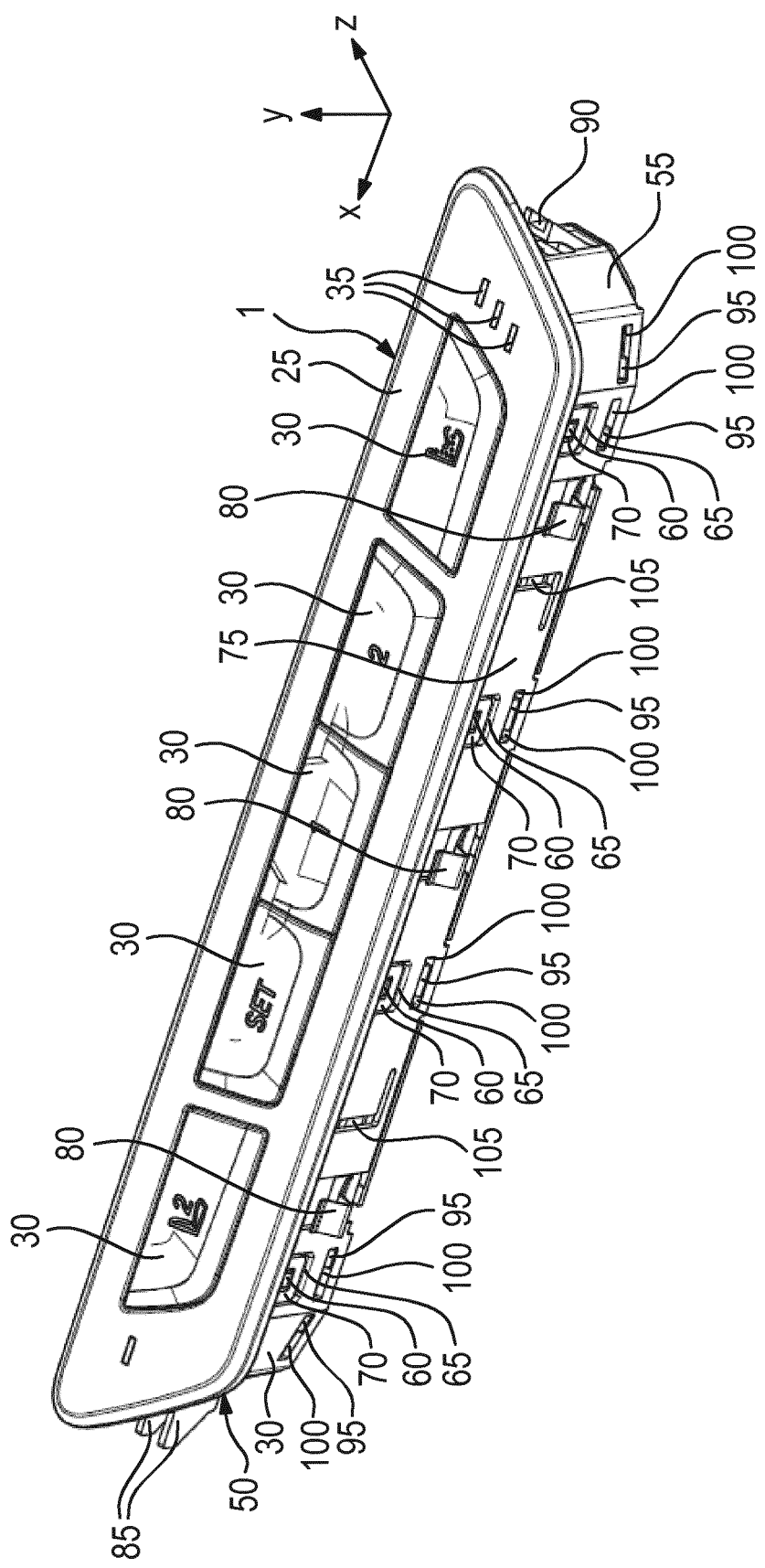
FIG. 3 is a perspective view, from obliquely below, of the control element housing.

FIG. 3 shows the control element 1 shown in FIG. 2, now in perspective view from obliquely below. A bottom face 75 is connected to the front face 25, the first side face 50 and the second side face 55. To connect the bottom face 75 to the front face 25, the locking hooks 60 provided in depressions 65 and known from FIG. 2 along with tabs 70 may be provided accordingly.

In the exemplary embodiment shown here, the first side face 50 and the second side face 55 are formed integrally with the bottom face 75. This is not however essential; rather, the first side face 50 and/or the second side face 55 may be connected as separate components to the bottom face 75, for example glued or welded.

In the exemplary embodiment shown here, a secure fixing of the control element housing 1 to the door interior trim 5 in the z-direction (i.e. vertically) is achieved by means of three tabs 80, which protrude firstly on the bottom face 75 and secondly on the top face 45 and can engage in corresponding openings (not shown) of the door interior trim 5. A secure fixing of the control element housing 1 in the x-direction, i.e. horizontally, is achieved by means of locking hooks 85 arranged on the first side face 50, or by means of a spring 90 arranged on the second side face 55, which are held in corresponding receivers (not shown) of the door interior trim 5.

In this exemplary embodiment, the rear face 40 is also secured to the top face 45 or bottom face 75 by means of a tongue-groove connection: tabs 95 provided on the rear face 40 engage in corresponding recesses or grooves 100 of the top face 45 or bottom face 75.

With reference to FIG. 4A, the arrangement of the tabs 95 in the recesses 100 is shown in more detail in a top view onto the top face 45. The top face 45 is formed symmetrically to the height plane H of the control element housing 1, wherein the height plane H lies in the y-z plane corresponding to the convention selected, or runs parallel thereto. The tabs 95 which are directly adjacent in the height plane H are arranged in the recesses 100 such that they are held in the y-direction and z-direction, but have some play in the x-direction. The tabs 95 spaced further from the height plane H, i.e. those adjacent to the locking hooks 85 or springs 90, in contrast lie against the top face 45 with their respective flanks which are adjacent to the height plane H. At the same time, the recesses 100 allow the tabs 95 some play in their respective regions remote from the height plane H. As a whole therefore, the top face 45 is securely held on the rear face 40 in the normal operating state of the motor vehicle 15. On application of a load however, the top face 45 may move by a defined length relative to the tabs 95, as will be explained in more detail below.

It is pointed out that the configuration of the tongue-groove connection of the rear face 40 to the top face 45 may be formed correspondingly in the connection of the rear face 40 and bottom face 75.

FIG. 4A also shows four predefined structural weakenings 105 which are provided on the top face 45 symmetrically to the height plane H. In the specific case here, the structural weakenings 105 are recesses in the top face 45. This is not however essential, but the structural weakenings 105 could also comprise material thinning on the top face 45. The structural weakenings 105 allow easier deformation of the control element housing 1, as will be described below.

FIG. 4B shows an enlarged view of the right-hand structural weakenings 105 shown in FIG. 4A. The top structural weakening 105 shown in FIG. 4B is L-shaped, wherein a first leg 110 extends transversely to the rear face 40 in the x-direction, while the second leg 115 of the structural weakening 105 runs substantially parallel to the rear face 40 in the y-direction. The respective ends of the first leg 110 or second leg 115 are formed rounded, in order to improve a force flow in the plane spanned by the top face 45. The second structural weakening 105 shown in FIG. 4B is adjacent to the front face 25 and substantially formed as a triangle 120. This triangle 120 also has rounded corners in order to improve a force flow within the top face 45. It is pointed out that the type, number and position of the structural weakenings 105 shown in this exemplary embodiment are selected arbitrarily, and may also be defined differently depending on the anticipated load case. In this context, it is important to note that a movement of the top face 45 and bottom face 75 relative to the rear face 40 may occur under application of a load, without the structural unit of the control element housing 1 according to the invention suffering damage.

The structural weakenings 105 shown in this exemplary embodiment result in a control element housing 1 provided with openings in which moisture and/or dust could penetrate. Therefore a sealing device 125, in particular a plastic film, is provided which covers the openings produced by the structural weakenings 105.

Figure 5:
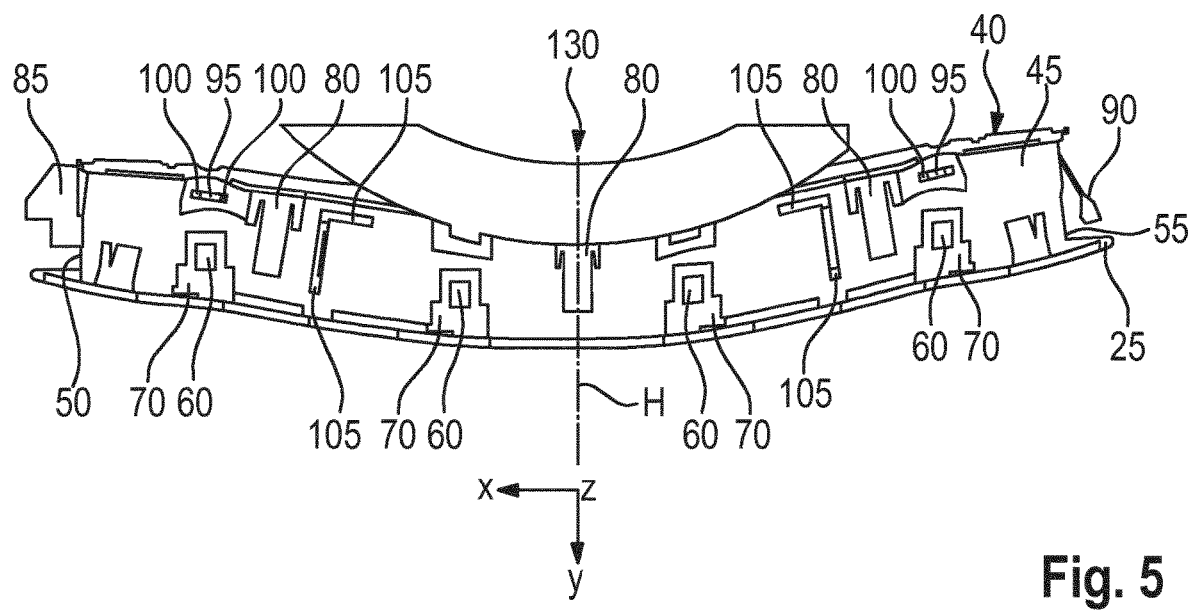
FIG. 5 shows the control element housing depicted in FIG. 4A under load.

FIGS. 1 to 4B show the control element housing 1 or the door interior trim 5 according to the invention in a normal state. FIG. 5, however, shows in top view the control element housing 1 according to the invention in a state in which a load 130 acts in the y direction against the rear face 40. This is the case for example if the control element housing 1 arranged in the door interior trim 5 is subjected to a load 130 because of a side impact against the vehicle door 10. In such a case, the control element housing 1 is substantially exposed to a bending load about its vertical axis Y and is deformed. Because of the structural weakenings 105, the top face 40 and the bottom face 75 interlock, without the control element housing 1 itself breaking or detaching from the door interior trim 5. The material of the top face 45 or bottom face 75 adjacent to the structural weakenings 105 acts in the same way as a virtual rotary joint. In such a case, a person (not shown) seated on the seat 20 is therefore not injured by the control element housing 1 according to the invention, in particular in the case of a side impact of the motor vehicle 15. The flexibility of the control element housing 1 is further improved by the tongue-groove arrangement of the tabs 95 and recesses 100, since the rear face 40—as also shown in FIG. 5—can move substantially parallel to the front face 25 relative to the first side face 50 and the second side face 55. In a particularly advantageous fashion, in this way not only is the structure of the integrated control element housing 1 retained but also its function. Advantageously therefore, the control element housing 1 differs from the control element housings known from the prior art because of a flexibility or elasticity in the direction of an applied load 130, so that it has a longer service life. In addition, the risk of injury to a vehicle occupant in the event of a side impact is reduced, since a door interior trim 5 according to the invention also holds the control element housing 1 according to the invention, in the case of a crash or load, without this penetrating the interior of the motor vehicle 15. In a particularly advantageous fashion, due to the inherent flexibility of the control element housing 1, damage from sharp edges (not shown) on occurrence of the load case shown here is also avoided.

LIST OF REFERENCE SYMBOLS

1 Control element housing
5 Door interior trim
10 Vehicle door
15 Motor vehicle
20 Seat
25 Front face
30 Buttons
35 Displays
40 Rear face
45 Top face
50 First side face
55 Second side face
60 Locking hooks
65 Depressions
70 Tabs
75 Bottom face
80 Tabs
85 Locking hooks
90 Spring
95 Tabs
100 Recesses
105 Structural weakenings
110 First leg
115 Second leg
120 Triangle
125 Sealing device
130 Load
135 Plug housing
F Main direction of travel
H Height plane
Y Vertical axis
x, y, z Cartesian vehicle-oriented coordinate system The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control element housing, comprising:
   a front face which receives at least one control element;
   a rear face lying opposite the front face;
   a first side face and a second side face lying opposite the first side face, wherein the two side faces connect the front face to the rear face;
   a bottom face which connects the two side faces and the rear face together; and
   a top face lying opposite the bottom face and connecting the front face, the first side face, the second side face and the rear face, wherein
      one or both of the bottom face and the top face has at least one structural weakening configured to allow the control element housing to deform under mechanical load,
      the structural weakening is a recess or a material thinning on the bottom face and/or the top face, and
      the structural weakening comprises an L-shape structural weakening situated in the plane of the bottom face and/or the top face.

2. The control element housing as claimed in claim 1, wherein
   a first leg of the L-shape is arranged substantially parallel to the first side face and/or the second side face, and
   a second leg of the L-shape is arranged substantially parallel to the rear face.

3. The control element housing as claimed in claim 1, wherein
   the rear face is configured so as to be movable relative to the first side face, the second side face, the bottom face and the top face.

4. The control element housing as claimed in claim 1, wherein the rear face comprises at least one locking device which engages in recesses of the bottom face and/or the top face.

5. The control element housing as claimed in claim 1, wherein
at least two structural weakenings are provided, which are arranged symmetrically to a height plane of the control element housing.

6. The control element housing as claimed in claim 1, wherein locking devices are provided on the first side face and on the second side face.

7. A door interior trim, comprising:
a door interior trim surface; and
a control element housing arranged in the door interior trim surface, the control element housing comprising:
a front face which receives at least one control element;
a rear face lying opposite the front face;
a first side face and a second side face lying opposite the first side face, wherein the two side faces connect the front face to the rear face;
a bottom face which connects the two side faces and the rear face together; and
a top face lying opposite the bottom face and connecting the front face, the first side face, the second side face and the rear face, wherein
one or both of the bottom face and the top face has at least one structural weakening configured to allow the control element housing to deform under mechanical load,
the structural weakening is a recess or a material thinning on the bottom face and/or the top face, and
the structural weakening comprises an L-shape structural weakening situated in the plane of the bottom face and/or the top face.

* * * * *